United States Patent [19]

Garvey

[11] Patent Number: 5,161,678

[45] Date of Patent: Nov. 10, 1992

[54] ACCUMULATOR COVER

[75] Inventor: Mark C. Garvey, Blue Anchor, N.J.

[73] Assignee: Garvey Corporation, Blue Anchor, N.J.

[21] Appl. No.: 746,614

[22] Filed: Aug. 19, 1991

[51] Int. Cl.⁵ ............................................. B65G 21/20
[52] U.S. Cl. .............................. 198/860.3; 198/860.5; 198/453; 198/347.4
[58] Field of Search ............... 198/347.1, 347.4, 860.3, 198/860.5, 453

[56] References Cited

U.S. PATENT DOCUMENTS

| | | | |
|---|---|---|---|
| 3,506,110 | 4/1970 | Paul et al. | 198/347.4 |
| 3,650,371 | 3/1972 | Constable et al. | 198/347.4 X |
| 3,856,135 | 12/1974 | Hayakawa et al. | 198/860.5 |
| 3,944,054 | 3/1976 | Ensinger | 198/860.3 |
| 4,401,207 | 8/1983 | Garvey | 198/453 X |
| 4,815,583 | 3/1989 | Le Corre et al. | 198/453 X |

Primary Examiner—Robert P. Olszewski
Assistant Examiner—James R. Bidwell
Attorney, Agent, or Firm—Norman E. Lehrer

[57] ABSTRACT

A cover for an article conveyor or accumulator having a table-like support surface includes a substantially planar and transparent member mounted above the support surface. The distance between the cover and the support surface is adjusted to be slightly greater than the height of the articles being carried on the conveyor or accumulator. The cover maintains the articles in their upright position by preventing them from tipping over.

12 Claims, 3 Drawing Sheets

ACCUMULATOR COVER

BACKGROUND OF THE INVENTION

The present invention is directed toward a cover for an accumulator and, more particularly, toward the combination of a cover and accumulator which cooperate with each other to prevent articles on the accumulator from tipping over.

Product or article accumulators are well known in the conveyor art. These accumulators are used in conjunction with moving conveyor belts and allow articles being carried on the belts to be temporarily stored in the event that the take-away or out-feed portion of the conveyor belt is temporarily blocked or stopped or if the products are, for some other reason, prevented from moving along the conveyor line. One such article accumulator is shown, for example, in U.S. Pat. No. 4,401,207, the entire subject matter of which is incorporated herein by reference.

As is well known in the art, product accumulators such as those shown in the above-mentioned patent are comprised of a substantially planar table-like surface having conveyor belts moving in different directions thereon. As products begin to accumulate, they abut against each other as they transfer to the conveyor belts moving in the opposite direction.

The foregoing creates no particular problem as long as the articles being conveyed have substantially vertical side walls and are not top heavy. That is, cylindrical articles such as metal cans or the like standing on end will merely push up against each other 's they accumulate but will nor tend to tip over.

Problems are created, however, when it is desired to accumulate articles that do not have vertical side walls and particularly those that are larger at the top than at the bottom. Similar problems can exist when the articles may be top heavy or when they include a cap or lid at the top thereof which may make the top larger than the bottom. Such articles are shown, for example, in FIGS. 2 and 8 herein. As is well known to those skilled in the art, as these types of articles are accumulated, the top of one article engages the top of another and they have a tendency to tip over as shown in FIG. 2.

One solution to the foregoing problem has been to invert these types of articles so that they are conveyed and accumulated with the larger portion at the bottom. This tends to maintain the proper vertical orientation of the articles as they are being accumulated. However, in most production lines, the articles are produced or filled with the larger portion at the top and it is desirable to have the articles eventually delivered in this same upright orientation. This has required additional equipment to first invert the articles before they are fed into the accumulator and to then re-invert them after they leave the accumulator. This procedure obviously substantially increases the expenses of conveying and accumulating such articles and may also have a tendency to degrade the contents of the container.

SUMMARY OF THE INVENTION

The present invention is designed to overcome the above-mentioned problems of prior art accumulators when attempting to convey and accumulate articles which may be larger at the top than at the bottom. This is accomplished by providing the accumulator with a substantially planar cover member which is mounted above the support surface of the accumulator but parallel thereto. The distance above the accumulator is slightly greater than the height of the articles being conveyed and accumulated. While the articles may still have the tendency to tip as they abut each other, tipping is prevented by the top edges of the articles hitting the cover. The cover is adjustably mounted on the accumulator so as to accommodate different size articles. Preferably, the cover is transparent so that production personnel can observe the operation of the accumulator.

BRIEF DESCRIPTION OF THE DRAWINGS

For the purpose of illustrating the invention, there is shown in the accompanying drawings one form which is presently preferred; it being understood that the invention is not intended to be limited to the precise arrangements and instrumentalities shown.

DETAILED DESCRIPTION OF THE PREFERRED EMBODIMENT

Figure 1:
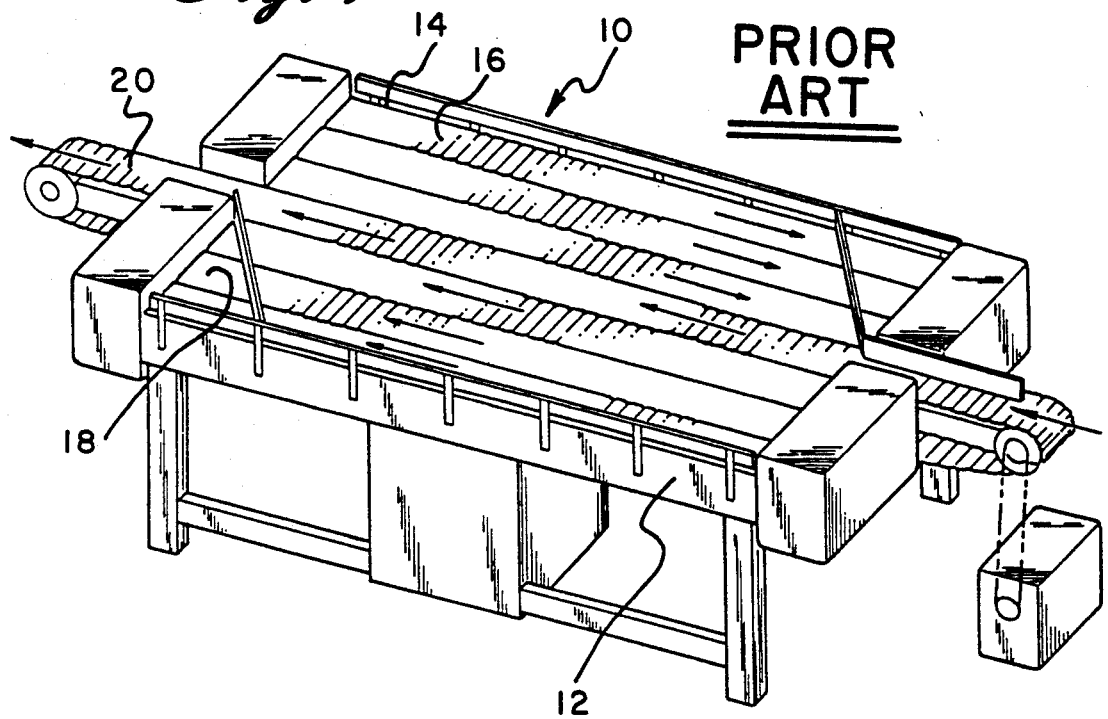
FIG. 1 is a top perspective view of a prior art accumulator with which the cover of the present invention may be employed.

Referring now to the drawings in detail wherein like reference numerals have been used throughout the various figures to designate like elements, there is shown in FIG. 1 a prior art accumulator 10 which is useful with the present invention. This prior art accumulator is of the type shown, for example, in U.S. Pat. No. 4,401,207. Accumulator 10 includes a frame 12 which supports a table-like support surface 14 comprised of a plurality of moving belts 16 and 18. A feed-through conveyor in the form of a belt 20 brings articles into and out of the accumulator 10. The manner in which the accumulator 10 is constructed and operates is fully described in U.S. Pat. No. 4,401,207. Accordingly, a detailed description thereof is not believed to be necessary herein.

Figure 2:
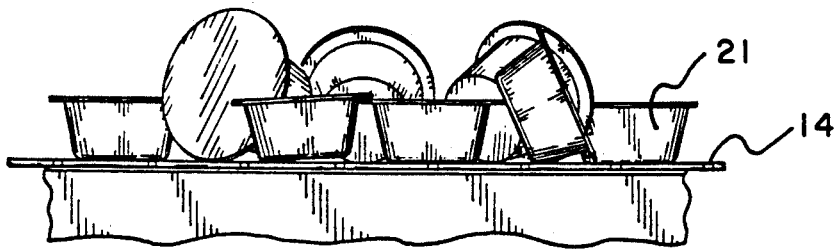
FIG. 2 illustrates the problem of attempting to accumulate non-cylindrical articles.
Figure 3:
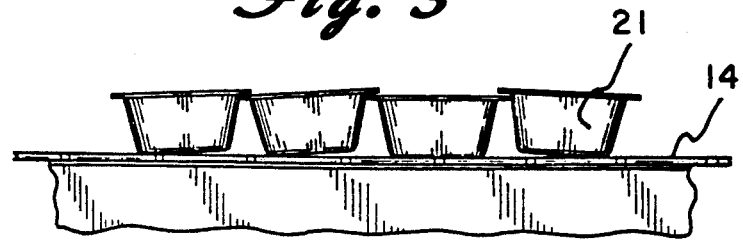
FIG. 3 illustrates a similar problem with articles having relatively large cover lips.
Figure 4:
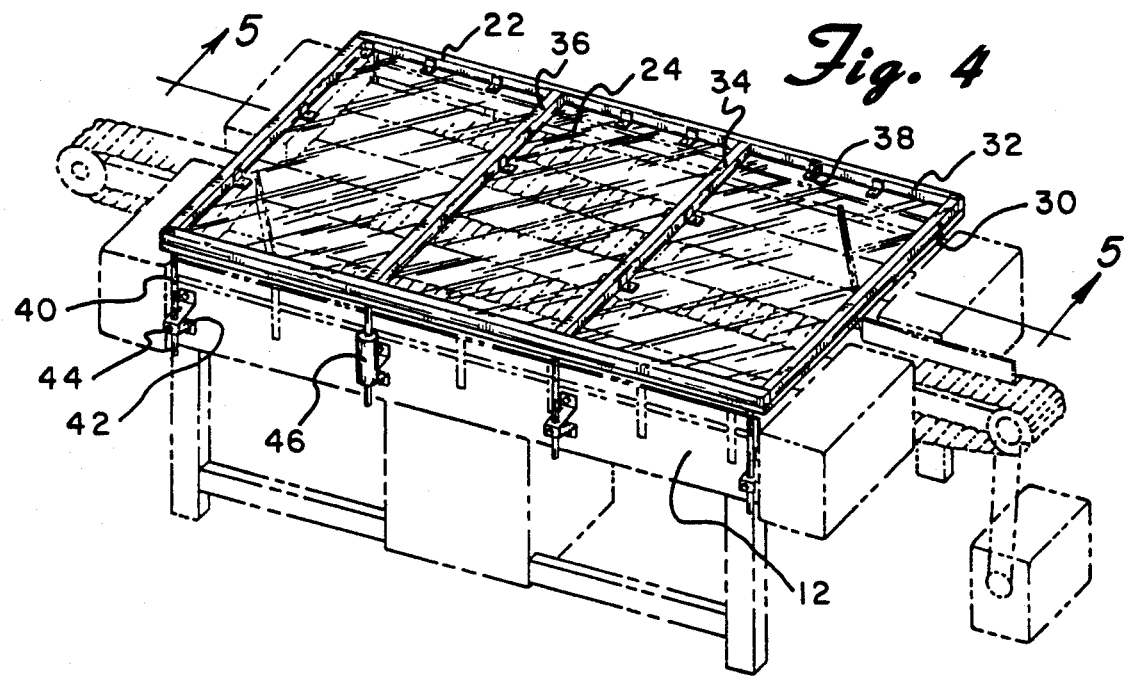
FIG. 4 is a view similar to FIG. 1 but showing a cover constructed in accordance with the principles of the present invention in place.
Figure 5:
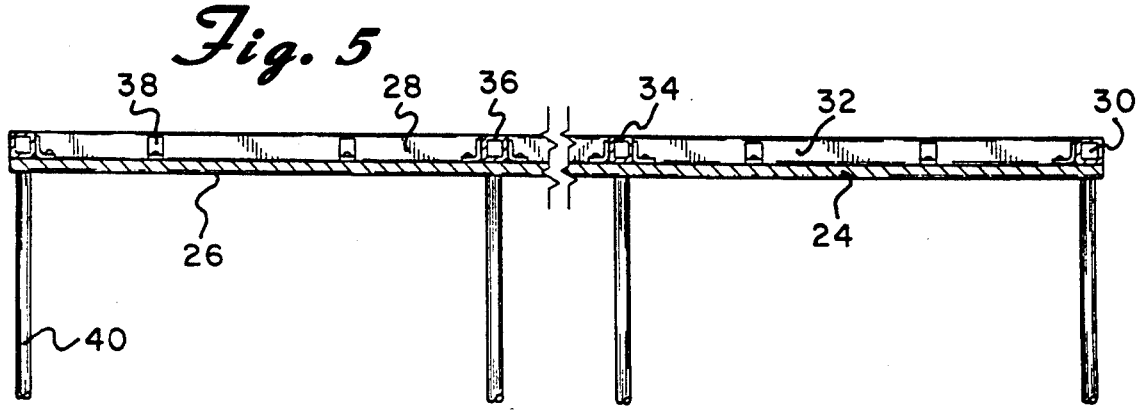
FIG. 5 is a cross-sectional view taken through the line 5-5 of FIG. 4.

As pointed out above, when an accumulator such as shown in FIG. 1 is utilized to accumulate articles 21 which are larger at the top than at the bottom, they frequently tip over as shown in FIG. 2 and, therefore, interfere with the proper operation of the accumulator. Even if they do not tip over, the articles 21 can get stuck as shown in FIG. 3 when they have large peripheral top lips that may interlock when they tilt slightly. In order to prevent this from happening, the present invention is provided with a cover 22 such as shown in FIG. 4.

Cover 22 is comprised essentially of a substantially planar member 24 which has a lower surface 26 and an upper surface 28. The planar member 24 is preferably comprised of a transparent or at least translucent material such as glass or an acrylic plastic or the like.

For ease of handling and mounting, the planar member 24 is preferably secured to a frame comprised of peripheral end and side frame members 30 and 32, respectively, and a pair of intermediate frame members 34 and 36. The planar member 24 is secured to the frame members 30, 32, 34 and 36 through the use of a plurality of L-shaped brackets such as shown at 38. In the preferred embodiment of the invention, the cover 22 is substantially the same size as the table-like support surface 14 of the accumulator 10. As will be readily apparent to those skilled in the art, however, there are certain portions of the accumulator 10 where articles are not accumulated and it is, therefore, not absolutely necessary that the cover overlie these particular portions.

Extending downwardly from the side frame members 32 of the cover 22 are a plurality of rods 40. These rods cooperate with rod-receiving support members 42 carried on the frame or support structure 12 of the accumulator 10. The rod-receiving support members 42 are each provided with an adjustment bolt 44. When bolt 44 is loosened, the rods 40 and, therefore, the entire cover member 22 can be moved up or down. When the cover member 22 is in its desired position, the bolts 44 are tightened.

In lieu of the support members 42 and adjustment bolts 44, it may also be possible to provide each of the rods 40 with a power driven hydraulic or air cylinder 46 or the like for adjusting the height of the cover member 22. Similarly, the rods could be replaced with racks or the like and the support members 42 could include electric motors having gears which engage the racks. Other types of power driven mechanisms will be readily apparent to those skilled in the art. In any case, utilizing a power driven mechanism would allow for the simultaneous movement of all of the support rods and for more precise adjustments. This could be done by either some type of automatic control mechanism or individual manual switches on each of the power driven devices.

Figure 6:
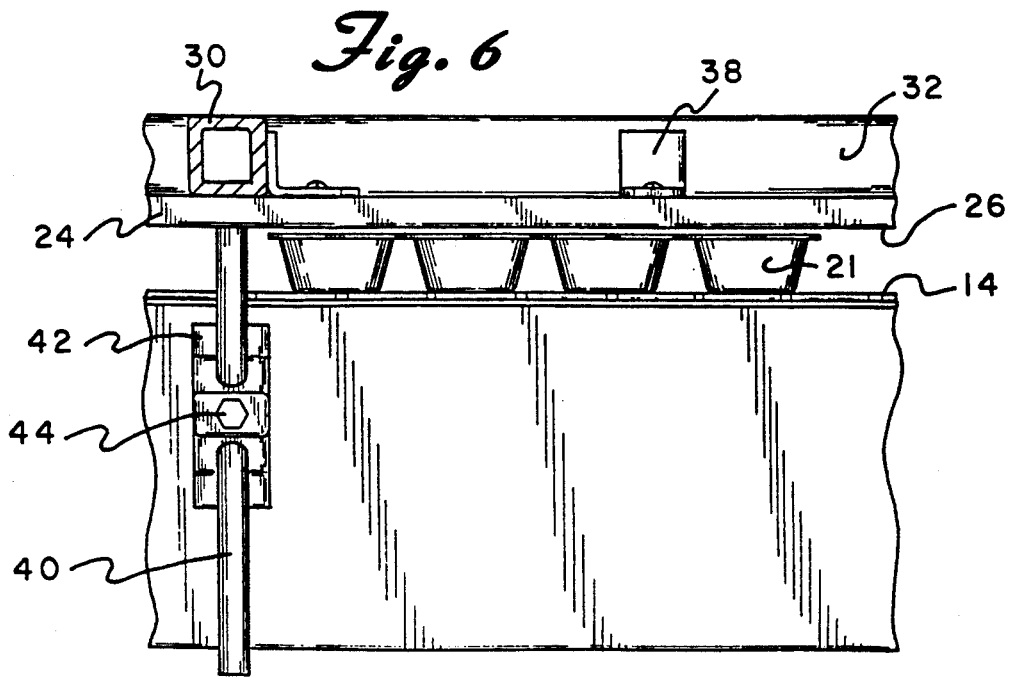
FIG. 6 is a partial side elevational view illustrating the manner in which the articles shown in FIG. 2 can be carried by the accumulator-cover combination of the present invention.
Figure 7:
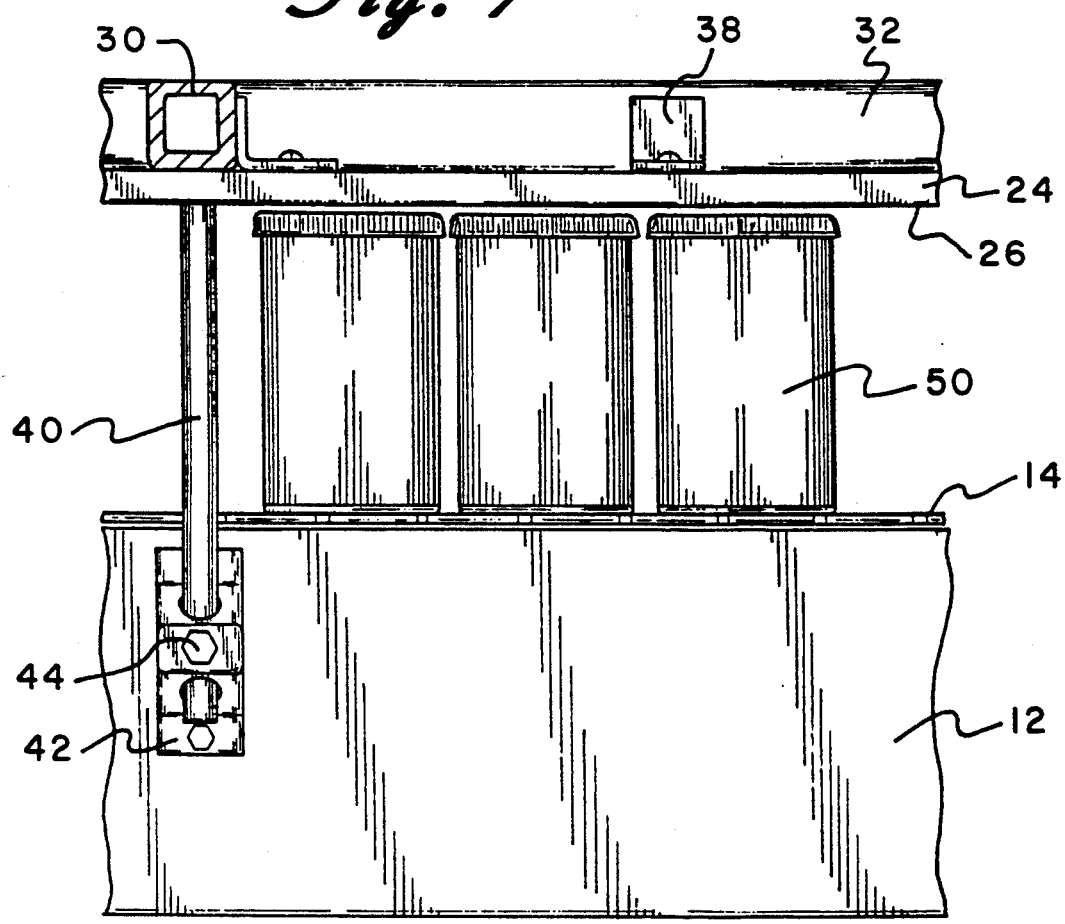
FIG. 7 is a view similar to FIG. 6 showing another type of article being accumulated.
Figure 8:
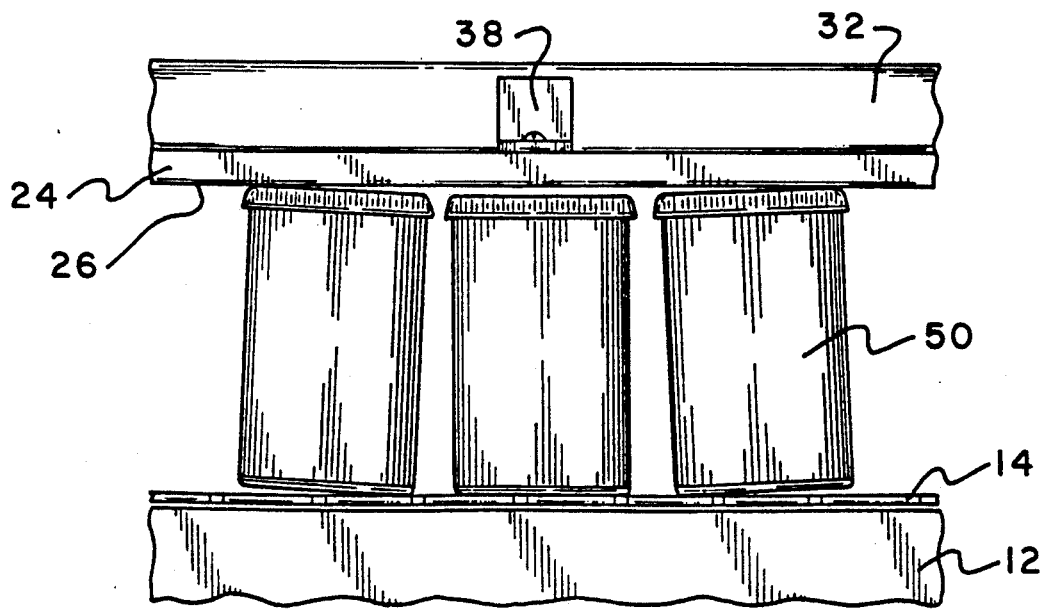
FIG. 8 is a view similar to FIG. 7 showing the extent to which the cover of the present invention allows some limited movement of the articles being accumulated.

As illustrated best in FIGS. 6, 7 and 8, the cover member 22 operates in cooperation with the accumulator 10 in the following manner. First, the height of the cover member 22 is adjusted in the manner described above so as to be substantially parallel with the support surface 14 of the accumulator 10 but at a height which is just slightly greater than the height of the articles 21 (FIG. 6) being accumulated. When larger articles such as the containers 50 shown in FIG. 7 are being accumulated, the cover 22 is, of course, raised so as to be slightly above the tops of the articles 50. While the articles 21 or 52 still tend to tip when they are being accumulated, they do not tip over since their tops tend to touch the undersurface 26 of the planar member 24 as shown in FIG. 8. This prevents them from tipping over and maintains the articles in their upright positions.

The present invention may be embodied in other specific forms without departing from the spirit or essential attributes thereof and accordingly reference should be made to the appended claims rather than to the foregoing specification as indicating the scope of the invention.

I claim:

1. A cover means for an accumulator of the type having a substantially planar surface and wherein a plurality of substantially identical articles move across said surface in multiple directions;
    said cover means comprising a substantially continuous and planar member having an upper surface and a lower surface, and
    means mounting said member above said accumulator such that said lower surface is spaced from but substantially parallel to said accumulator surface and further including means for adjusting the height of the space between said lower surface and said accumulator surface.

2. The invention as claimed in claim 1 wherein said planar member is substantially transparent.

3. The invention as claimed in claim 1 wherein said means for adjusting said height includes a plurality of rods extending between said planar member and said accumulator adjacent the periphery of said planar member.

4. The invention as claimed in claim 3 wherein said rods are secured to one of said planar member or accumulator and wherein a plurality of adjustable rod receivers are secured to the other of said planar member or accumulator.

5. The invention as claimed in claim 1 wherein said cover means includes a plurality of rods extending downwardly from the periphery of said planar member and further including a plurality of adjustable rod receivers secured to said accumulator.

6. The invention as claimed in claim 1 wherein said means for adjusting said height is power driven.

7. In a product accumulator having a table-like support surface for moving and accumulating a plurality of substantially identically shaped articles which may have a tendency to tilt or tip over when being accumualted, said articles moving across said support surface in multiple directions, the improvement comprising means for maintaining said articles in their substantially upright condition, said maintaining means comprising a substantially continuous and planar cover and means mounting said cover above the top of said support surface at a distance which is slightly greater than the height of said articles, said cover being substantially parallel to said support surface and further including means for adjusting the height of said cover.

8. The invention as claimed in claim 7 wherein said cover is substantially transparent.

9. The invention as claimed in claim 7 further including a plurality of rods extending downwardly form the periphery of said top for supporting the same.

10. The invention as claimed in claim 7 wherein said means for adjusting said height is power driven.

11. The invention as claimed in claim 7 wherein said means for adjusting said height includes a plurality of rods extending between said cover and said accumulator adjacent the periphery of said planar member.

12. The invention as claimed in claim 11 wherein said rods are secured to one of said cover or accumulator and wherein a plurality of adjustable rod receivers are secured to the other of said cover or accumulator.

* * * * *

(12) EX PARTE REEXAMINATION CERTIFICATE (5670th)
United States Patent
Garvey

(10) Number: US 5,161,678 C1
(45) Certificate Issued: Feb. 13, 2007

(54) ACCUMULATOR COVER

(75) Inventor: Mark C. Garvey, Blue Anchor, NJ (US)

(73) Assignee: Garvey Corporation, Blue Anchor, NJ (US)

Reexamination Request:
No. 90/007,053, May 26, 2004

Reexamination Certificate for:
Patent No.: 5,161,678
Issued: Nov. 10, 1992
Appl. No.: 07/746,614
Filed: Aug. 19, 1991

(51) Int. Cl.
*B65G 47/51* (2006.01)

(52) U.S. Cl. .............................. 198/860.3; 198/347.4; 198/453; 198/860.5

(58) Field of Classification Search .................... None
See application file for complete search history.

(56) References Cited

U.S. PATENT DOCUMENTS

| | | |
|---|---|---|
| 3,685,632 A | 8/1972 | Brady |
| 4,252,232 A | 2/1981 | Beck et al. |
| 4,828,434 A | 5/1989 | Fairman et al. |
| 5,009,550 A | 4/1991 | Hilbish et al. |

*Primary Examiner*—David O. Reip

(57) ABSTRACT

A cover for an article conveyor or accumulator having a table-like support surface includes a substantially planar and transparent member mounted above the support surface. The distance between the cover and the support surface is adjusted to be slightly greater than the height of the articles being carried on the conveyor or accumulator. The cover maintains the articles in their upright position by preventing them from tipping over.

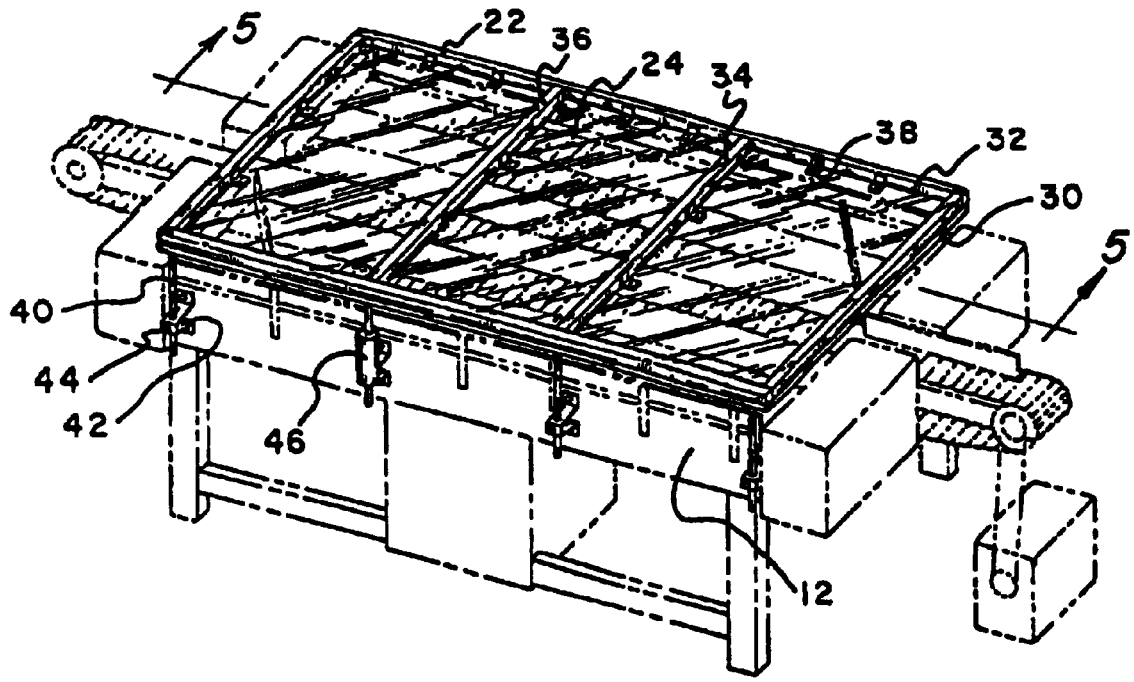

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 7–12 are cancelled.

Claims 2–6 are determined to be patentable as amended.

New claims 13 and 14 are added and determined to be patentable.

2. The invention as claimed in claim [1] *13* wherein said planar member is substantially transparent.

3. The invention as claimed in claim [1] *13* wherein said means for adjusting said height includes a plurality of rods extending between said planar member and said accumulator *frame* adjacent the periphery of said planar member.

4. The invention as claimed in claim 3 wherein said rods are secured to one of said planar member or accumulator *frame* and wherein a plurality of adjustable rod receivers are secured to the other of said planar member or accumulator *frame*.

5. The invention as claimed in claim [1] *13* wherein said cover means includes a plurality of rods extending downwardly from the periphery of said planar member and further including a plurality of adjustable rod receivers secured to said accumulator *frame*.

6. The invention as claimed in claim [1] *13* wherein said means for adjusting said height is power driven.

*13. An article conveying and accumulation system, said system comprising:*

*(a) article support surface means, table-like in configuration, for the accumulation of articles on the surface means and for the movement of articles from an in-feed end of the system to an out-feed end of the system on a plurality of surface means accumulator conveyor belts/chains traveling in one direction and a plurality of surface means accumulator conveyor belts/chains traveling in the opposite direction, both pluralities of accumulator conveyor belts/chains being aligned parallel to each other;*

*(b) an accumulator frame supporting the surface means;*

*(c) a cover positioned in spaced relation substantially parallel to and over the surface means, said cover comprising a substantially enclosed cover frame having a pair of peripheral end members and a pair of side members and a substantially continuous planar member secured to the end and side members; and*

*(d) means mounting the side members of the cover directly to the accumulator frame for positioning the cover above the surface means, such that the planar member remains spaced from and substantially parallel to the surface means, said mounting means further comprising means on the accumulator frame for adjusting the height of the planar member over the surface means.*

*14. The invention as claimed in claim 13 wherein said planar member is substantially the same size as the surface means.*

\* \* \* \* \*